(12) United States Patent
Shah

(10) Patent No.: US 8,561,067 B2
(45) Date of Patent: Oct. 15, 2013

(54) TEST SUITES FOR VIRTUALIZED COMPUTING ENVIRONMENTS

(75) Inventor: Amit Shah, Pune (IN)

(73) Assignee: Red Hat, Inc., Raleigh, NC (US)

( * ) Notice: Subject to any disclaimer, the term of this patent is extended or adjusted under 35 U.S.C. 154(b) by 168 days.

(21) Appl. No.: 13/149,272

(22) Filed: May 31, 2011

(65) Prior Publication Data

US 2012/0311569 A1   Dec. 6, 2012

(51) Int. Cl.
*G06F 9/455* (2006.01)

(52) U.S. Cl.
CPC .................................. *G06F 9/45533* (2013.01)
USPC ............................................... 718/1; 717/126

(58) Field of Classification Search
None
See application file for complete search history.

(56) References Cited

U.S. PATENT DOCUMENTS

| | | | |
|---|---|---|---|
| 2007/0168970 A1* | 7/2007 | Li et al. | 717/124 |
| 2009/0228589 A1* | 9/2009 | Korupolu | 709/226 |
| 2010/0115342 A1* | 5/2010 | Shigeta et al. | 714/37 |
| 2010/0153924 A1* | 6/2010 | Andrews | 717/126 |
| 2010/0250824 A1* | 9/2010 | Belay | 711/6 |
| 2010/0332658 A1* | 12/2010 | Elyashev | 709/226 |
| 2011/0066597 A1* | 3/2011 | Mashtizadeh et al. | 707/640 |
| 2011/0093436 A1* | 4/2011 | Zha et al. | 707/639 |
| 2011/0107148 A1* | 5/2011 | Franklin | 714/37 |
| 2011/0131576 A1* | 6/2011 | Ikegaya et al. | 718/1 |
| 2011/0145380 A1* | 6/2011 | Glikson et al. | 709/223 |
| 2011/0161491 A1* | 6/2011 | Sekiguchi | 709/224 |
| 2011/0161851 A1* | 6/2011 | Barber et al. | 715/769 |
| 2011/0225587 A1* | 9/2011 | Mealey et al. | 718/102 |
| 2011/0276684 A1* | 11/2011 | Singh et al. | 709/224 |
| 2011/0320556 A1* | 12/2011 | Reuther | 709/213 |
| 2012/0117558 A1* | 5/2012 | Futty et al. | 717/176 |
| 2012/0151483 A1* | 6/2012 | Belay | 718/1 |

* cited by examiner

*Primary Examiner* — Emerson Puente
*Assistant Examiner* — Mehran Kamran
(74) *Attorney, Agent, or Firm* — Lowenstein Sandler LLP

(57) ABSTRACT

A method and system for performing tests in a virtualized computing environment. A test suite includes test code for testing emulation of a device associated with a guest hosted by a computer system. The computer system sets an input parameter of a migration command in the test code to a first value to turn off the migration command. The computer system executes the test code to produce a first result. The computer system also sets the input parameter of the migration command to a second value to turn on the migration command, and executes the test code to produce a second result. Turning on the migration command causes the guest to migrate to a second hypervisor. Based on the first result and the second result, the computer system determines whether an error occurs in migration of the guest or in the emulation of the device.

20 Claims, 5 Drawing Sheets

```
max_times = int(params.get("max_times", 100))
logging.info("Eject the cdrom for %s times" % max_times)
max = max_times
while max > 0:
        vm.monitor.cmd("eject %s" % device)
        wait_for_migration(self.migrate)
        (device, file) = get_cdrom_info()
        if file is not None:
                raise error.TestFail("%s is not ejected" % cdrom)
        cdrom = cdrom_new
        if max % 2 == 0:
                cdrom = cdrom_orig
        vm.monitor.cmd("change %s %s" % (device, cdrom))
        time.sleep(10)
        wait_for_migration(self.migrate)
        (device, file) = get_cdrom_info()
        if file != cdrom:
                raise error.TestError("%s is not changed" % cdrom)
        max -= 1
```

FIG. 3

TEST SUITES FOR VIRTUALIZED COMPUTING ENVIRONMENTS

TECHNICAL FIELD

Embodiments of the present invention relate to testing in a computer system, and more specifically, to testing the functionality of a virtual machine system.

BACKGROUND

A virtual machine system can include multiple host computers and each host computer can support multiple virtual machines. Each virtual machine runs a guest operating system and guest applications (collectively referred to as a "guest") for a client. From time to time a system administrator may want to move ("migrate") a guest from one host computer ("source host") to another host computer ("target host") for maintenance or performance reasons. The migration may be an "online migration" (also referred to as "live migration"), which means that the guest can be moved without disconnecting its clients or applications.

During an online migration, the guest keeps running on the source host while it is being migrated to the target host. Most of the data used by the guest is transferred to the target host, while the guest continues to run normally on the source host. There is a brief period when the guest is paused on the source host, during which all of the critical data of the guest is transferred to the target host. After the data transfer, the guest resumes running on the target host.

By contrast, an offline migration means stopping the guest on the source host, recording its state, and then resuming the guest later on the target host. There is a significant time gap between the end of the operation of the guest at the source host and the beginning of the operation of the guest at the target, which is visible to the clients of the guest as well as the guest itself. This can potentially disrupt the function of the applications of the guest and disconnect the clients of the guest in some scenarios.

Due to the complexity of the migration code, it is very easy for bugs to creep in during development of the migration code. For example, a guest can have access to a number of devices, and the states of the devices can change during operation. Device states supported by the source host may not be available on the target host. As a result, migrating the guest can lead to guest crashes and/or unexpected behavior after either an online or offline migration.

Conventionally, test engineers routinely develop tests that start a guest and migrate it in various states: e.g., during installation of the guest, after installation of the guest, and while the guest is performing network I/O. These scenarios test various workloads and various code paths in the migration code. It is time-consuming for the test engineers to develop test code that covers all of these scenarios.

BRIEF DESCRIPTION OF THE DRAWINGS

The present invention is illustrated by way of example, and not by way of limitation, and can be more fully understood with reference to the following detailed description when considered in connection with the figures in which:

FIG. 3 illustrates an example embodiment of device test code.

DETAILED DESCRIPTION

Described herein is a method and system for developing and performing tests in a virtualized computing environment that utilizes existing device test codes. In one embodiment, a test suite is developed for a virtualized computing environment. The test suite includes test code for testing emulation of a device associated with a guest hosted by a computer system. The emulation of the device is performed by a first hypervisor associated with the guest. The computer system sets an input parameter of a migration command, which is located within the test code, to a first value to turn off the migration command. The computer system then executes the test code with the migration command turned off to produce a first result. Turning off the migration command causes the guest to maintain its association with the first hypervisor. The computer system also sets the input parameter of the migration command to a second value to turn on the migration command. The computer system then executes the test code with the migration command turned on to produce a second result. Turning on the migration command causes the guest to migrate to a second hypervisor. Based on the first result and the second result, the computer system determines whether an error occurs in migration of the guest or in the emulation of the device.

Embodiments of the invention integrate migration testing into existing device test code. As a large number of test cases have already been developed for testing devices, the same test cases can be used to test migration with minimized additional efforts. The migration path in the integrated testing can be turned on and off, such that it can be determined whether the migration code or the device emulation code causes an error. Thus, embodiments of the invention provide a systematic approach to the development of migration tests that allow existing device test code to be utilized whenever such code is available. If device test code for a test case has not been developed but such a test case is important for testing migration, a test engineer can write the device test code first and then extend it for migration. Embodiments of the invention allow testing of both online migration and offline migration.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
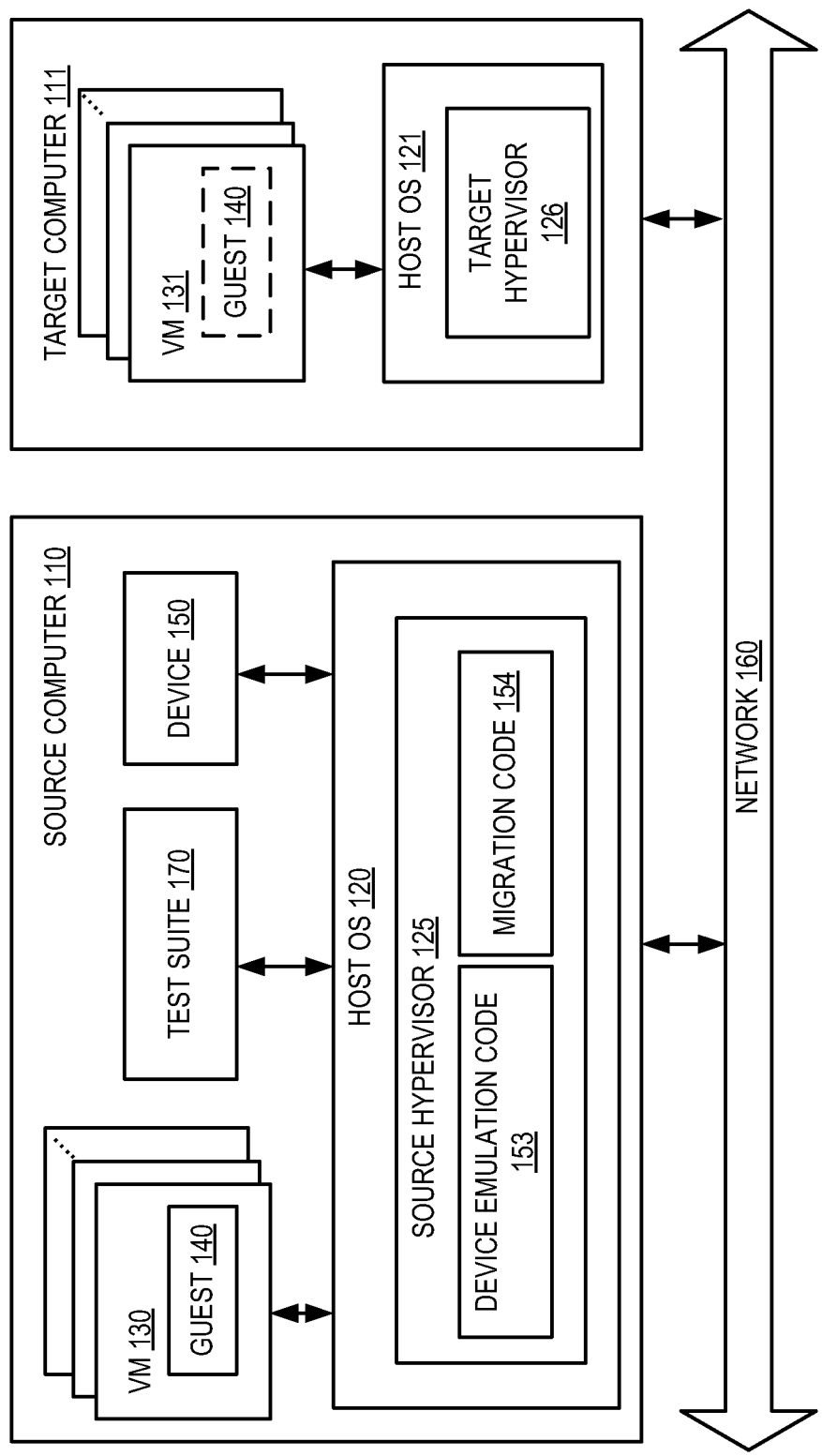
FIG. 1 is a block diagram of one embodiment of a virtual computer system.

FIG. 1 is a block diagram that illustrates an embodiment of a source computer 110 and a target computer 111. The source computer 110 hosts a plurality of virtual machines (VM) 130. Each virtual machine 130 runs software (such as a guest operating system and guest applications), which is collectively referred to as a "guest" (e.g., a guest 140). The virtual machines 130 may run the same or different guest operating systems, such as Microsoft Windows®, Linux®, Solaris®, Mac® OS, and similar operating systems. The source computer 110 may be a server computer, a workstation, a personal computer (PC), or similar computing device.

The source computer 110 also runs a host operating system 120 to manage system resources, including but not limited to, one or more processors, memory, data storage, input/output (I/O) devices, and other hardware and software resources.

The source computer 110 also hosts a source hypervisor 125 to virtualize access to the underlying source computer 110 hardware, which makes the use of the virtual machines 130 transparent to users. The source hypervisor 125 is also known as a virtual machine monitor (VMM) or a kernel-based hypervisor, and can be part of the host operating system 120.

In one embodiment, one of the guests 140 hosted by the source computer 110 is capable of migrating to another location; e.g., moving to another host computer ("a target computer 111"), or to a different hypervisor within the same source computer 110. Whether the guest 140 migrates to a different host computer or to a different hypervisor within the same host computer is transparent to the guest 140 and the clients (e.g., client applications) of the guest 140. Although the embodiment of FIG. 1 shows the guest 140 migrating between two host computers, it is understood that the testing described herein is also applicable to other scenarios including migration between two hypervisors within the same host computer, as well as migration between two different host computers. For example, a XEN hypervisor and a VMWare hypervisor may both be hosted by the same host computer, and a guest 140 may be migrated from the XEN hypervisor to the VMWare hypervisor. In another example, a guest 140 may be migrated to from one version of a hypervisor (e.g., a KVM hypervisor, version 1) to a second version of the hypervisor (e.g, the KVM hypervisor, version 2). Further, the migration described herein can be online migration or offline migration. For example, when migrating a guest 140 from a first hypervisor (e.g., a XEN hypervisor) to a second, different type of hypervisor (e.g., a VMWare hypervisor), the migration may be an offline migration. In one embodiment, migrating a guest 140 from a first hypervisor (e.g., a XEN hypervisor) to a second, different type of hypervisor (e.g., a VMWare hypervisor) may be performed online (e.g., a online migration). In another example, the when migrating a guest 140 from a first version of a hypervisor (e.g., a KVM hypervisor, version 1) to a second version of the hypervisor (e.g, the KVM hypervisor, version 2), the migration may be an online migration. In a further example, he when migrating a guest 140 from a first version of a hypervisor (e.g., a KVM hypervisor, version 1) to a second version of the hypervisor (e.g, the KVM hypervisor, version 2), the migration may also be an offline migration In one embodiment, the target computer 111 runs a host operating system 121 and hosts a target hypervisor 126. Similar to the source computer 110, the target computer 111 also hosts multiple virtual machines 131. The target computer 111 can be a server computer, a workstation, a personal computer (PC), or similar computing device. In one embodiment, the source computer 110 and the target computer 111 are both coupled to a network 160, which may be a private network (e.g., a local area network (LAN), a wide area network (WAN), intranet, or other private networks) or a public network (e.g., the Internet).

In one embodiment, each hypervisor 125, 126 emulates a number of devices for its guests. Examples of the devices include, but are not limited to, network interface cards (NICs), CD/DVD drives, disks, graphics cards, sound cards, video cards, modems, bridges, and similar components and the sub-components of these devices. The device can be a software device or a physical hardware device emulated by the hypervisors 125, 126. In one embodiment, the hypervisor 125 includes device emulation code 153 for emulating a device 150 in the source computer 111. The device 150 is associated with (e.g., accessible by) the guest 140 and may be shared by other guests 140 and/or other applications executing on the source computer 110. For example, the device 150 can be a network card used by any one of the multiple guests 140 to access the network 160. It is understood that each hypervisor 125, 126 can emulate any number of devices, and, for each device, can include corresponding device emulation code for emulating that device. In another embodiment, the device emulation code 153 for emulating the device 150 may not correspond to the actual device 150. For example, the device emulation code 153 may be associated with a NIC from the manufacturer "Intel®" but device 150 may be a NIC from the manufacturer "Realtek®."

In one embodiment, the hypervisor 125 also includes migration code 154 for migrating the guest 140 to another location (e.g., the target computer 111). The execution of the migration code can cause online migration or offline migration. By executing the migration code 154, the host computer 110 opens up a new connection to the target hypervisor 126 to obtain hypervisor-specific information. Once the guest 140 migrates to the target computer 111, commands for the source hypervisor 125 (e.g., eject CDROM or insert new CDROM command directed to a CDROM drive emulated by the source hypervisor 125) are re-directed to the target hypervisor 126. In one embodiment, the command directed to the emulated device by a hypervisor may not involve a physical device. Using the CD-ROM example above, although the eject CDROM command may be directed to an emulated CD-ROM device within VM 130, the physical CDROM (e.g., device 150) may not eject a CD. In another embodiment, the emulated device may not have a corresponding physical device. For example, a computer may not have a physical CDROM drive even though the emulated device within VM 130 is an emulated CDROM. In a further embodiment, some physical devices may be "passed through" to the guest 140 (e.g., the guest may perform operations and/or send commands to the physical device) For example, a NIC card may be passed through to the guest 140. In one embodiment, when a physical device is passed through to a guest 140, other guests and/or applications may not be able to access the physical device. For example, when a NIC is passed through to the guest 140, the, other applications on the host may not be able to access the NIC (e.g., because the NIC is flagged as unavailable by the host operating system and/or hypervisor). In another embodiment, when a physical device is passed through to a guest 140, other guests and/or applications may still be able to access the physical device. For example, when a physical CDROM device is passed through to a guest 140, other applications on the host computer may still access the CDROM drive.

According to embodiments of the invention, the source computer 110 runs a test suite 170 to test the device emulation code 153 and the migration code 154. The test suite 170 includes a number of device test codes, which tests a first scenario where the guest 140 migrates to another location, and a second scenario where the guest does not migrate. In one embodiment, the device test code contains a migration command, which can be turned on to invoke the migration code 154 and migrate the guest 140. The migration command can also be turned off to not migrate the guest 140. By comparing a first test result from the first scenario with a second test result from the second scenario, one (e.g., a test engineer or a test script) can validate the device emulation code 153 and the migration code 154, or determine whether an error has occurred in the device emulation code 153 or the migration code 154. In another embodiment, a combination of software and/or software residing on another computer (e.g., a server computer) may run test suite 170 to test the device emulation code 153 and the migration code 154.

Figure 2:
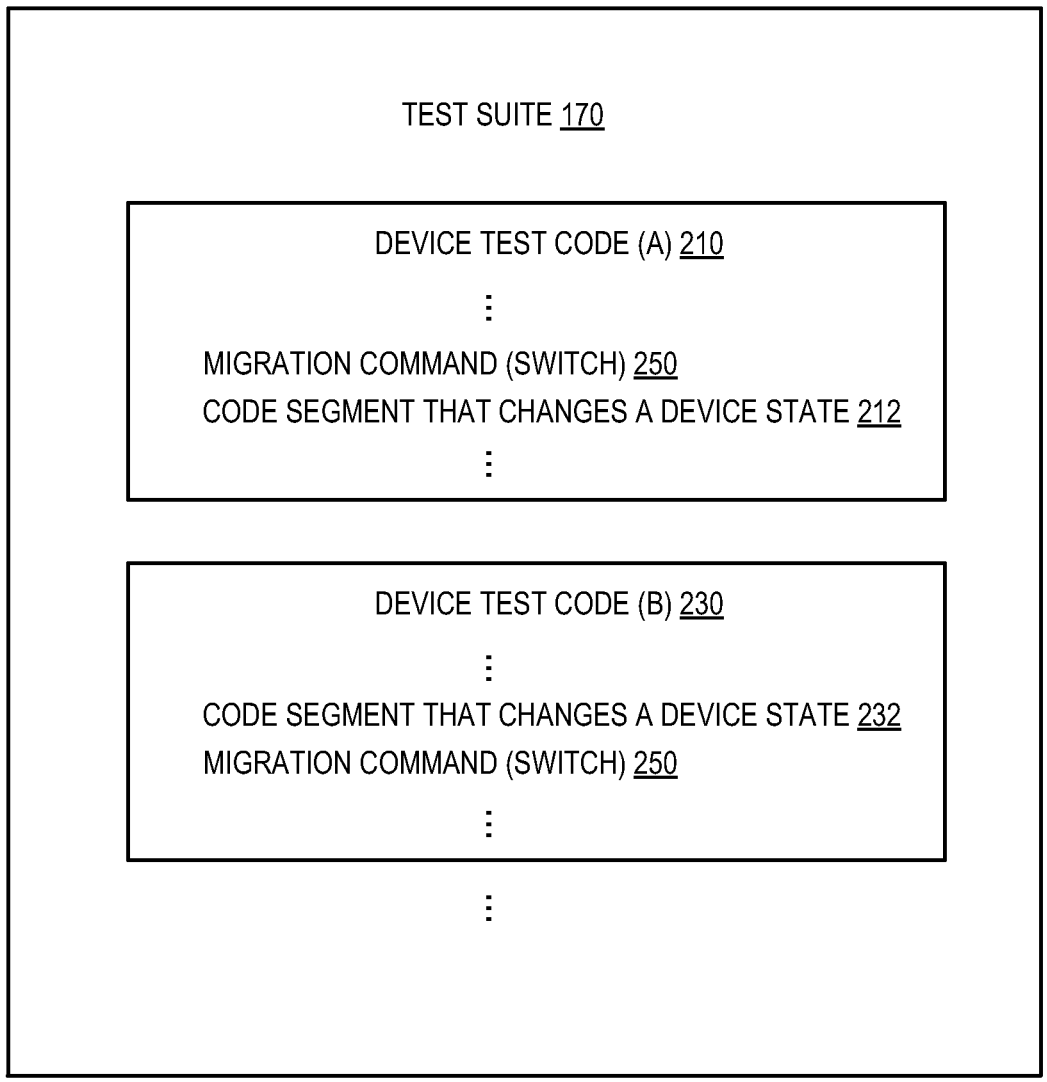
FIG. 2 is a diagram illustrating one embodiment of a test suite that includes a number of device test codes.

FIG. 2 illustrates an example of the test suite 170 according to one embodiment of the invention. The test suite 170 includes a number of device test codes (e.g., 210, 230). Each device test code 210, 230 includes a code segment 212, 232, which in turn includes one or more instructions to cause a change in the state of a device. A migration command 250 can be placed before, after, or both before and after each code segment 212, 232. The migration command 250 has an input parameter "switch," whose value can be set to enable migration or to disable migration. For example, setting the switch to "0" turns off the migration command 250 and disables migration, and setting the switch to "1" turns on the migration command 250 and enables migration. In one embodiment, the device test code 210, 230 can test the same device in different test scenarios (e.g., one for inserting a CDROM and the other one for ejecting or stopping a CDROM), or they can test different devices. In one embodiment, the device test code 210, 230 is existing code for testing devices in a virtual machine system, and the migration command 250 is inserted into the existing code to take advantage of the test scenarios that are already developed for testing the devices.

FIG. 3 illustrates an example of test code 300 in the test suite 170 according to one embodiment of the invention. A first portion 330 of the test code 300 includes an instruction "vm.monitor.cmd('eject . . . ')" that causes a CDROM to be ejected from a virtual CDROM drive emulated by a source hypervisor. A first migration command 310 "wait_for_migration(self.migrate)" is placed after the "eject" instruction. The value of self.migrate can be set to a first value (e.g., zero) to disable migration or a second value (e.g., one) to enable migration. Then the test code in the first portion 330 determines whether the CDROM ejection has been performed correctly; e.g., whether the guest 140 can still access the data on the CDROM after it is ejected. An error has occurred if the guest 140 can access the data on the ejected CDROM.

In the example test code 300, a second portion 340 of the code includes an instruction "vm.monitor.cmd ('change . . . ')" that causes a CDROM to be inserted into the virtual CDROM drive. A second migration command 320 "wait_for_migration(self.migrate)" is placed after the "change" instruction. In a scenario where the guest 140 has been migrated to a target hypervisor (e.g., self.migrate is set to 1), the state of the CDROM drive emulated by the target hypervisor needs to be the same as the state of the CDROM drive emulated by the source hypervisor after the insertion. The test code in the second portion 340 determines whether the insertion has been performed correctly with the migration command turned on and with the migration command turned off; e.g., whether the guest 140 can access the data on the newly-inserted CDROM. An error occurs if the guest 140 cannot access the data on the CDROM.

In one embodiment, when testing the emulated CDROM drive and migration, a tester (e.g., a test engineer or an automated test script) can set the parameter self.migrate to turn the migration command on or off. For example, if self.migrate=0, the migration is turned off (disabled), and if self.migrate=1, the migration is turned on (enabled). By turning off the migration, the functionality of the device code is tested without migration. By turning on the migration, the functionality of the device code and migration code are both tested.

Additional examples of device test code include, but are not limited to the following two cases. First case: (1) start a guest without a network card; (2) migrate the guest to a target host; (3) insert a network card to the guest; and (4) check if the guest can use networking. Second case: (1) start a guest without a network card; (2) insert a network card to the guest (e.g., hot-plugging a network card); (3) check if the guest can use networking; (4) migrate the guest to a target host; and (5) check if the guest can use networking.

For each device associated with a guest, one or more test cases can be devised to verify the emulation of the device with the migration command turned on and turned off. In each test case, test results are collected to determine whether the correct device state is presented to the guest. A first test result of a device test code with the migration command turned off is compared with a second test result of the same device test code with the migration command turned on. If both results indicate no error, then both the device emulation code (e.g., the device emulation code 153 of FIG. 1) and the guest migration code (e.g., the migration code 154 of FIG. 1) are correct. If the first test result indicates no error but the second test result indicates an error, then it is the guest migration code 154 that contains an error. If the first test result indicates an error, but the second test result indicates no error, then it is the device emulation code 153 that contains an error. In one embodiment, the guest migration code 154 may also contain one or more errors. If both test results indicate error, then it is possible that both the device emulation code 153 and the guest migration code 154 contain one or more errors, or that only the device emulation code 153 contains one or more errors. In one embodiment, the error may be caused by software regression; that is, the error is introduced when the code is updated to a newer version or when a new patch of the code is installed. A tester may repeat the same tests on an earlier version of the code to determine whether it is the software update that causes the error.

Figure 4:
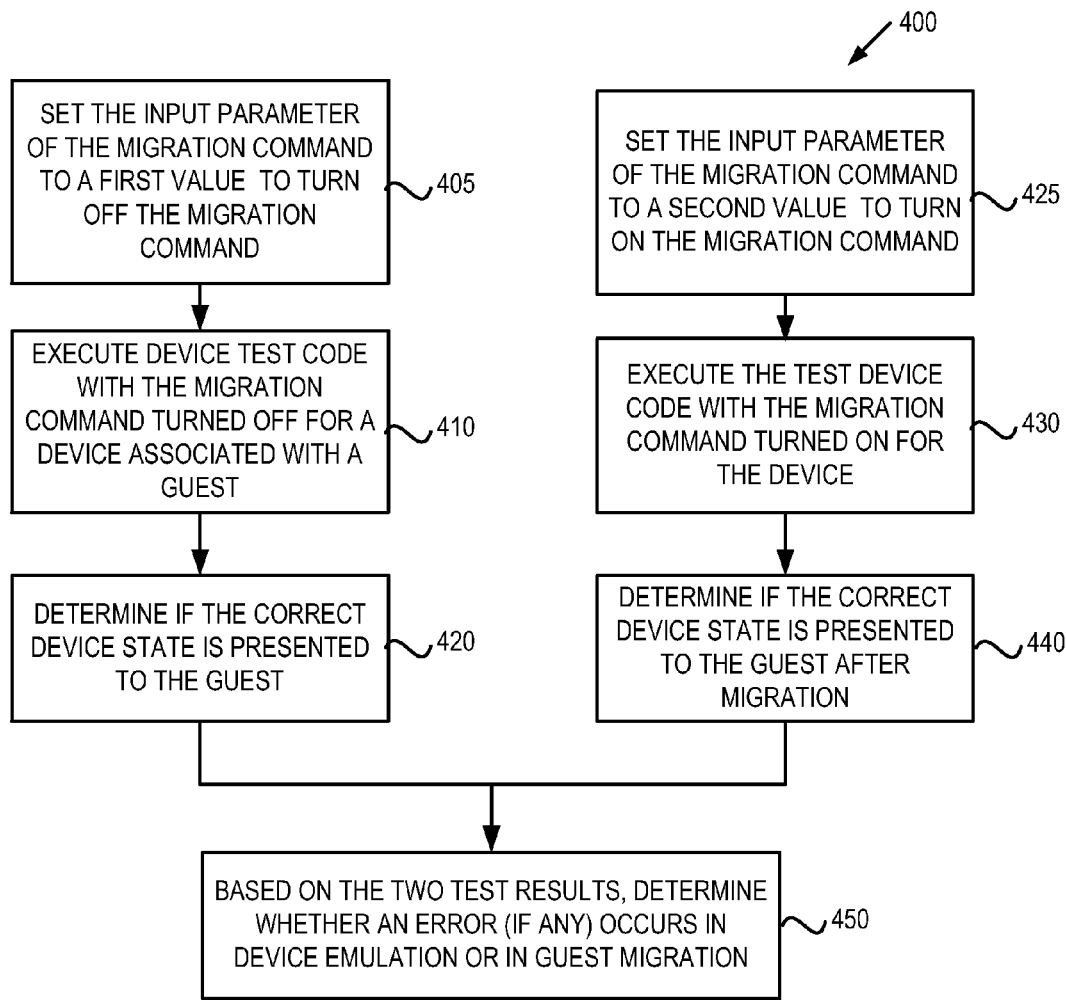
FIG. 4 is a flow diagram of one embodiment of a method for performing tests using device test code that includes a migration command.

FIG. 4 is a flow diagram illustrating one embodiment of a method 400 for performing tests in a virtual machine system. The method 400 may be performed by a computer system 500 of FIG. 5 that may comprise hardware (e.g., circuitry, dedicated logic, programmable logic, microcode, or other similar hardware logic), software (e.g., instructions run on a processing device), or a combination thereof. In one embodiment, the method 400 is performed by the source computer 110 of FIG. 1 that runs the test suite 170. In another embodiment, the method 400 may be performed by a separate computer (e.g., a server computer) which is in communication with the source computer 110 of FIG. 1, and the server computer may run the test suite 170.

Referring to FIG. 4, in one embodiment, the method 400 begins with the source computer 110 setting an input parameter of the migration command to a first value (e.g., zero) to turn off the migration command (block 405). The source computer 110 then executes device test code with the migration command turned off to test a device associated with the guest 140 (block 410). The device test code includes a code segment that changes a state of the device (e.g., start the device, stop the device, or other operations that can change a device state). The migration command can be placed before, after, or both before and after the state-changing code segment. The source computer 110 then determines whether the correct device state is presented to the guest 140 and is visible to guest 140 (block 420). The source computer 110 generates a first result based on this determination. In one embodiment, the device test code includes one or more instructions that communicate with the guest 140 after the change of the device state to verify the device state presented to the guest 140. The source computer 110 also sets the input parameter of the migration command to a second value (e.g., one) to turn on the migration command (block 425). The source computer 110 then executes the device test code with the migration command in the device test code turned on (block 430). The source computer 110 determines whether the correct device state is presented to the guest 140 and is visible to guest 140 after the migration (block 440). The source computer 110 generates a second result based on this determination. In one embodiment, the device test code includes one or more instructions that communicate with the guest 140 after the change of the device state and the migration to verify the device state presented to the guest 140. If there is an error in either of the test results, the source host machine 110 compares the first and second test results to determine whether the error occurs in the device emulation code 153 or in the migration code 154 (block 450). It is understood that the order of operations in FIG. 4 can be switched (e.g., blocks 410 and 420 can be performed before or after blocks 430 and 440) without changing the results of the tests.

In one embodiment, the state-changing code segment in the device test code can cause a device to be hot-plugged (e.g., inserted) into the computer system and/or hot-unplugged (e.g., removed) from the computer system. The source computer 110 then determines whether a correct state of the device is presented to the guest 140 after the hot-plugging and/or hot-unplugging. In another embodiment, the state-changing code segment in the device test code causes a virtual storage medium to be inserted into the device. The source computer 110 then determines whether a correct state of the device is presented to the guest 140 after the insertion.

Figure 5:
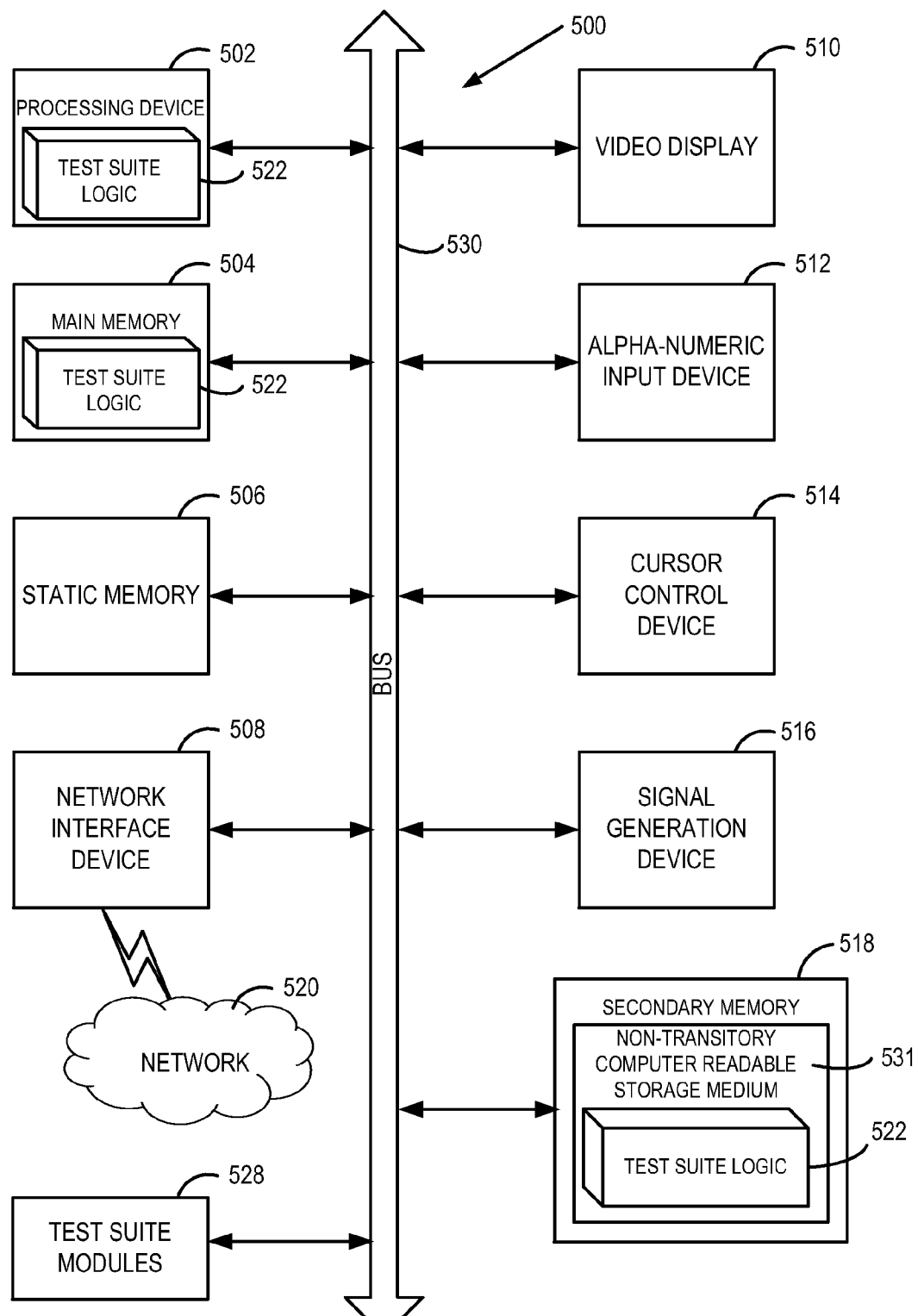
FIG. 5 illustrates a diagrammatic representation of a computer system implementing test suite logic.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), or other variations of memory), a static memory 506 (e.g., flash memory, static random access memory (SRAM), or other variations of static memory), and a secondary memory 518 (e.g., a data storage device), which communicate with each other via a bus 530.

The processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute test suite logic 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or more specifically a non-transitory computer readable storage medium 531) on which is stored one or more sets of instructions (e.g., the test suite logic 522) embodying any one or more of the methodologies or functions described herein (e.g., the test suite 170 of FIGS. 1 and 2). The test suite logic 522 may also reside, completely or at least partially, within the main memory 504 and/or within the processing device 502 during execution thereof by the computer system 500; the main memory 504 and the processing device 502 also constituting machine-readable storage media. The test suite logic 522 may further be transmitted or received over a network 520 via the network interface device 508.

The non-transitory computer readable storage medium 531 may also be used to store the test suite logic 522 persistently. While the non-transitory computer readable storage medium 531 is shown in an exemplary embodiment to be a single medium, the term "non-transitory computer readable storage medium" should be taken to include a single medium or multiple media (e.g., a centralized or distributed database, and/or associated caches and servers) that store the one or more sets of instructions. The term "non-transitory computer readable storage medium" shall also be taken to include any medium that is capable of storing or encoding a set of instructions for execution by the machine that causes the machine to perform any one or more of the methodologies of the present invention. The term "non-transitory computer readable storage medium" shall accordingly be taken to include, but not be limited to, solid-state memories, and optical and magnetic media.

The computer system 500 may additionally include test suite modules 528 for implementing the functionalities of the test suite 170 of FIGS. 1 and 2. The module 528, components and other features described herein (for example in relation to FIGS. 1 and 2) can be implemented as discrete hardware components or integrated in the functionality of hardware components such as ASICS, FPGAs, DSPs or similar devices. In addition, the module 528 can be implemented as firmware or functional circuitry within hardware devices. Further, the module 528 can be implemented in any combination of hardware devices and software components.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "setting," "executing," "determining," "causing," "changing," communicating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   setting, by a computer system, an input parameter of a migration command in a test code to a first value to turn off the migration command, the test code to test emulation of a device, by a first hypervisor, the device associated with a guest hosted by the computer system;
   executing, by the computer system, the test code with the migration command turned off to produce a first result, wherein turning off the migration command causes the guest to maintain association with the first hypervisor;
   setting, by the computer system, the input parameter of the migration command to a second value to turn on the migration command;
   executing, by the computer system, the test code with the migration command turned on to produce a second result, wherein the turning on the migration command causes the guest to migrate to a second hypervisor; and
   determining, using the first result and the second result, whether an error occurs in migration of the guest or in the emulation of the device.

2. The method of claim 1, wherein the test code comprises a code segment that changes a state of the device, and the migration command precedes or follows the code segment.

3. The method of claim 1, wherein the input parameter is a 1-bit value.

4. The method of claim 1, wherein executing the test code further comprises:
   causing the device to be hot-plugged into the computer system or hot-unplugged from the computer system; and
   determining whether a correct state of the device is presented to the guest after the hot-plugging or hot-unplugging.

5. The method of claim 1, wherein executing the test code further comprises:
   causing a virtual storage medium to be inserted into the device; and
   determining whether a correct state of the device is presented to the guest after the insertion.

6. The method of claim 1, wherein executing the test code with the migration command turned off further comprises:
   changing a state of the device; and
   communicating with the guest after the changing of the state and the migration of the guest to receive the first result, which indicates whether a correct state of the device is presented to the guest.

7. The method of claim 1, wherein executing the test code with the migration command turned on further comprises:
   changing a state of the device; and
   communicating with the guest after the changing of the state to receive the second result, which indicates whether a correct state of the device is presented to the guest.

8. A system, comprising:
   a memory to store a test code to test emulation of a device associated with a guest, the emulation performed by a first hypervisor associated with the guest; and
   a computer system coupled to the memory, the computer system operative to set an input parameter of a migration command in the test code to a first value to turn off the migration command, and to execute the test code with the migration command turned off to produce a first result, wherein the migration command, when turned off, causes the guest to maintain association with the first hypervisor,
   the computer system further operative to set the input parameter of the migration command to a second value to turn on the migration command, and to execute the test code with the migration command turned on to produce a second result, wherein the migration command, when turned on, causes the guest to migrate to a second hypervisor, and
   the computer system further operative to determine whether an error occurs in migration of the guest or in the emulation of the device in view of the first result and the second result.

9. The system of claim 8, wherein the test code comprises a code segment that changes a state of the device, and the migration command is located before or after the code segment.

10. The system of claim 9, wherein the code segment comprises one or more instructions that cause the device to be hot-plugged into the computer system or the guest, the device to be hot-unplugged from the computer system or the guest, a virtual storage medium to be inserted into the device, or the virtual storage medium to be removed from the device.

11. The system of claim 9, wherein the input parameter is a 1-bit value.

12. The system of claim 8, wherein, in response to a determination that the first result indicates no error and the second result indicates the error, the computer system operative to determine that the error occurs in the migration of the guest.

13. The system of claim 8, wherein, in response to a determination that the first result indicates the error and the second result indicates no error, the computer system operative to determine that the error occurs in the emulation of the device.

14. A non-transitory computer readable storage medium having stored therein instructions that, when executed by a computer system, cause the computer system to perform operations comprising:

setting an input parameter of a migration command in test code to a first value to turn off the migration command, the test code to test emulation of a device, by a first hypervisor, the device associated with a guest hosted by the computer system;

executing the test code with the migration command turned off to produce a first result, wherein turning off the migration command causes the guest to maintain association with the first hypervisor;

setting the input parameter of the migration command to a second value to turn on the migration command;

executing, by the computer system, the test code with the migration command turned on to produce a second result, wherein the turning on the migration command causes the guest to migrate to a second hypervisor; and determining, using the first result and the second result, whether an error occurs in migration of the guest or in the emulation of the device.

15. The non-transitory computer readable storage medium of claim 14, wherein the test code comprises a code segment that changes a state of the device, and the migration command precedes or follows the code segment.

16. The non-transitory computer readable storage medium of claim 14, wherein the input parameter is a 1-bit value.

17. The non-transitory computer readable storage medium of claim 14, wherein executing the test code further comprises:

causing the device to be hot-plugged into the computer system or hot-unplugged from the computer system; and determining whether a correct state of the device is presented to the guest after the hot-plugging or hot-unplugging.

18. The non-transitory computer readable storage medium of claim 14, wherein executing the test code further comprises:

causing a virtual storage medium to be inserted into the device; and determining whether a correct state of the device is presented to the guest after the insertion.

19. The non-transitory computer readable storage medium of claim 14, wherein executing the test code with the migration turned on further comprises:

changing a state of the device; and communicating with the guest after the changing of the state and the migration of the guest to receive the first result, which indicates whether a correct state of the device is presented to the guest.

20. The non-transitory computer readable storage medium of claim 14, wherein executing test code with the migration command turned off further comprises:

changing a state of the device; and communicating with the guest after the changing of the state to receive the second result, which indicates whether a correct state of the device is presented to the guest.

* * * * *